Dec. 20, 1955
A. G. WEIMERSHAUS
2,728,067
PROCESS AND APPARATUS FOR THE TRANSMISSION AND INDICATION OF TIME
Filed Nov. 28, 1950
2 Sheets-Sheet 1
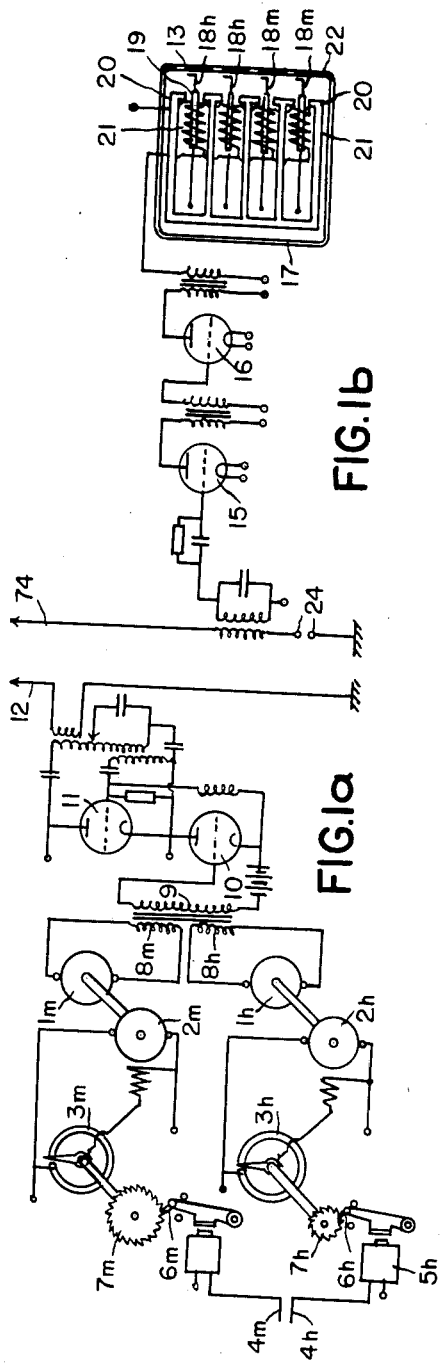
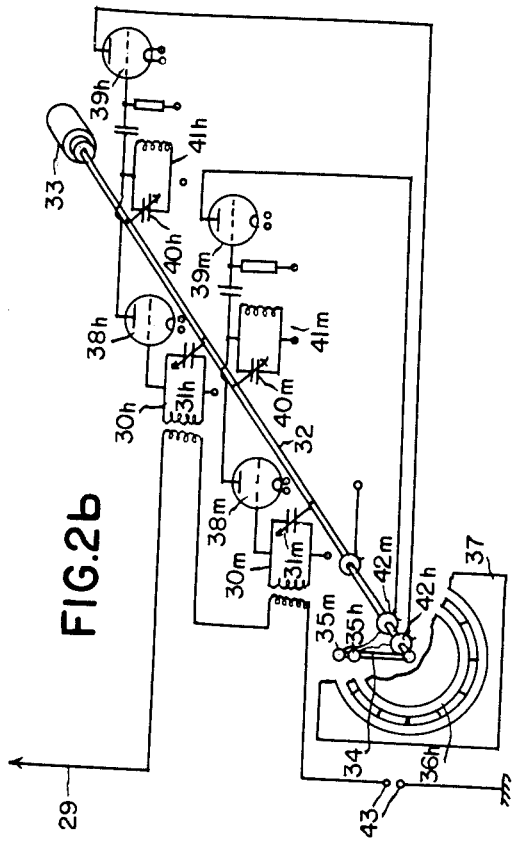
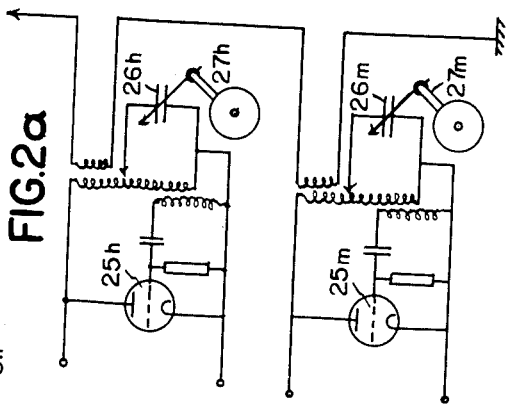
*INVENTOR.*
ALFRED G. WEIMERSHAUS
BY
*ATTORNEYS*

Dec. 20, 1955 A. G. WEIMERSHAUS 2,728,067
PROCESS AND APPARATUS FOR THE TRANSMISSION AND INDICATION OF TIME
Filed Nov. 28, 1950 2 Sheets-Sheet 2
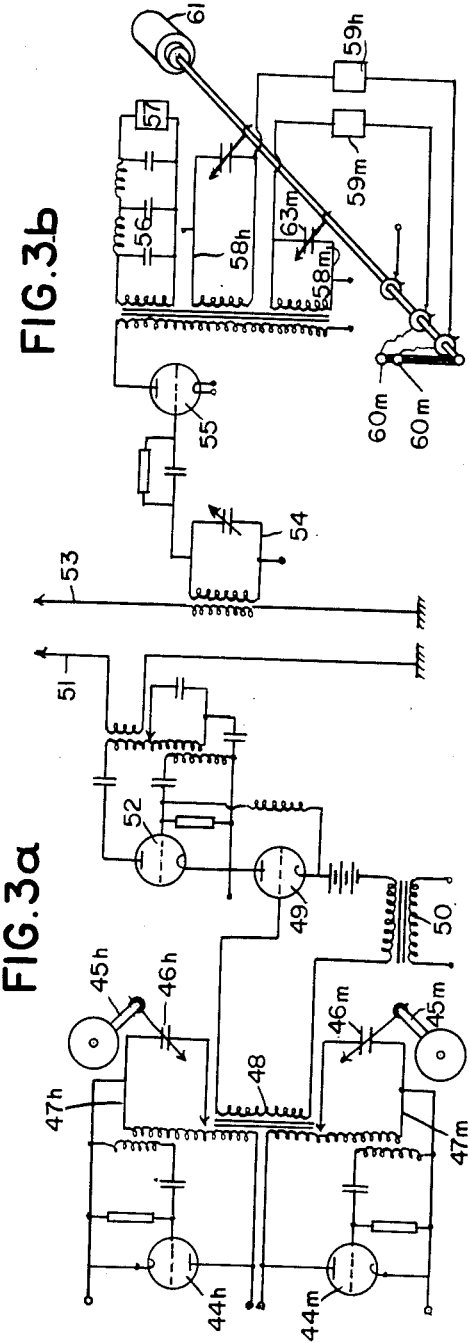
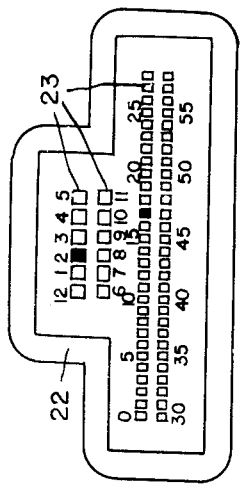
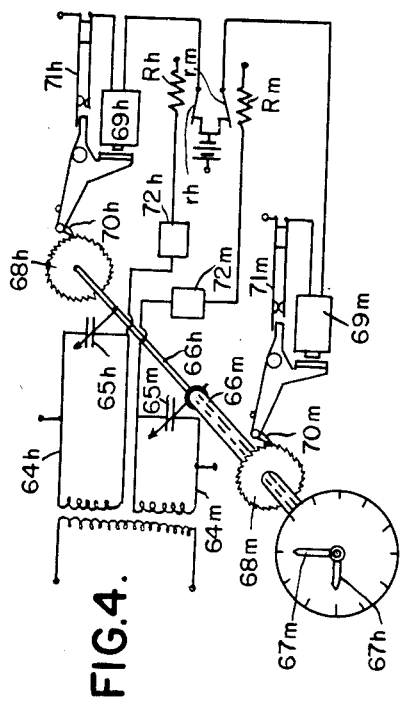
INVENTOR.
ALFRED G. WEIMERSHAUS
BY
ATTORNEYS United States Patent Office 2,728,067
Patented Dec. 20, 1955

2,728,067

PROCESS AND APPARATUS FOR THE TRANSMISSION AND INDICATION OF TIME

Alfred G. Weimershaus, Berlin-Steglitz, Germany

Application November 28, 1950, Serial No. 197,864

10 Claims. (Cl. 340—207)

The invention concerns a process, as well as devices made for the execution of this process, for the transmission and indication of time.

The ordinary clocks, driven by a mechanical power accumulator or synchronous motor have inaccuracies of operation, the first (except expensive special constructions) have to be regularly wound up, the latter, if stopped, have to be started. The secondary clocks, controlled from the center by electrical impulses, require a network of conductors. It is common to all known clocks that in case of failures of operation, such as stopping, they have to be started again, which with large clocks is a rather fussy job and may take much time. Moreover, the setting is generally by comparison with other clocks, which indication also may be erroneous.

An improvement is provided by the known process of sending time signals from a chronometer by wireless at certain large time intervals. However, in this case there remains the trouble of the adjustment of the local clock, aside from possible subjective errors. In the intermediate time between time signals again, there is no exact time signal delivered.

There has already been proposed an electric time transmission system in which time-variable frequencies produced for instance under control by a chronometer are sent out, received by wireless and converted in the receiver into a time indication, they acting on mechanical oscillators such as used in frequency meters or else on piezoelectric resonators. The indications of the mechanical oscillations are however, very undependable, particularly in case of external mechanical vibrations; the conversion of the piezo resonance into an indication is likewise difficult; furthermore for the indication of hours and minutes there must be provided at least 72 of such rigidly tuned resonators, in which connection there is obtained only an intermittent time indication. The method has therefore not yet been introduced generally despite the extreme advantage of the transmission principle of having available, at any time and any place (for instance, even in vehicles), the exact time by merely connecting such a radio clock, in which connection the transmission can be combined with other transmissions such as, for instance, radio transmissions.

The invention contemplates the use in an electric time transmission system in which time frequencies which are cyclically variable with the time are produced, transmitted and received as fundamental frequencies or modulations of a frequency, tunable oscillation receivers, and furthermore, means for the automatic tuning of the oscillation receivers to time frequencies, and means which actuate time indication marks as a function of this tuning. In this way a dependable indication is obtained with simple means. It is intended preferably to use continuously tunable oscillation receivers and furthermore means for the automatic tuning of the oscillation receivers to time frequencies and means which actuate time indication marks in a continuous motion as a function thereof. This improves the indication and makes it possible to get along with two determining frequencies for daily use inasmuch as in case of continuous change in frequency and minute indication the reading of fractions of a minute is also possible.

It will be understood that while apparatus for the transmission and indication of time is described herein, the scope of the invention is not so limited. Thus, for example, the variable condition, instead of time, may be the relative position of an object such as an elevator car the position of which is registered within the car or at some remote stop. The invention may also be useful in compass or gyro repeaters, rudder position repeaters, gauge or instrument repeaters, or in general remote indicators of a variable condition.

Further details of the process according to the invention may be seen below, in which, with reference to the drawing, devices are described which can be used for the execution of the new process. These are examples, the possibilities of variation are considerable. Especially all the circuits are to be considered as only diagrams for the elucidation of the principle. The execution in detail will depend on the requirements and the condition of the high frequency transmission and reception technique and will be determined automatically by that.

In the drawings,

Figure 1a is a diagrammatic circuit representing a transmission system for use with mechanical resonators.

Figure 1b is a diagrammatic representation of the receiving circuit associated with the transmitter illustrated in Figure 1a.

Figure 2a is a diagrammatic circuit representation of a transmitting system employing high frequency.

Figure 2b is a diagrammatic circuit representation of the receiving system for use with the transmitting system illustrated in Figure 2a.

Figure 3a is a diagrammatic circuit representation of a transmitter similar to that illustrated in Figure 2a but employing modulated frequency.

Figure 3b is a diagrammatic circuit representation of the receiving system for use in conjunction with the transmitting system illustrated in Figure 3a.

Figure 4 is a diagrammatic circuit representation illustrating the application of the invention to the control of clock hands associated with a conventional dial.

Figure 5 is a front elevation of a face plate employed in the receiving system especially illustrated in Figure 1b.

In the device according to Figures 1a and 1b, mechanical resonators are used as time frequencies, low frequencies and as oscillation receivers. The transmission and indication of hours and minutes is provided for. For indicating the hour at any time, a frequency is used, for example, of the series 16.0 16.5 17.0 17.5 . . . 21.5 Hz, for indicating the minutes another frequency, for example, from the series 30.0 30.5 31.0 31.5 . . . 59 Hz. For the production of these frequencies at a transmitting station, there are used alternating current generators $1h$ or $1m$, which are driven by direct current motors $2h$ or $2m$. The motors $2h$ and $2m$ have in their field current circuits speed governors $3h$ and $3m$, the resistances of which are variable in steps by step-by-step mechanisms. The magnet $5h$ receives a current impulse every hour and the magnet $5m$ receives one every minute from a chronometer over the conductors $4h$ and $4m$. The magnet $5h$, through a connecting pawl $6h$, moves a twelve toothed ratchet wheel $7h$ one tooth forward every hour, whereby the resistance of the speed governor $3h$ is varied each time in such a way that the frequency of the generator $1h$ increases or decreases by 0.5 Hz. Correspondingly, by means of magnet $5m$ and the connecting pawl $6m$ the sixty tooth ratchet wheel $7m$ and with it the speed governor $3m$ are shifted 0.5 Hz per minute in the direction of the variation of the minute frequency. The adjustments of the speed governor are repeated cyclically after each 12 hours or 60 minutes. The two indicating frequencies are given through windings 8h and 8m of a modulation transformer 9 in the grid circuit of the modulation tube and modulate a high frequency which is generated in the transmission tube 11 and radiated through the antennae 12.

For the indication of the time, this high frequency is taken by means of an oscillation circuit 13, tuned to it, from an antenna 14 and given to an audion 15. From this the two time frequencies pass, for example, through another low frequency amplification stage 16, into a time indicating device 17, which is constructed like the known vibrating reed frequency meters. It contains for the hour indications 12 oscillating tongues 18h, the mechanical natural frequencies of which are turned to the hour frequencies (that is, for example, 16.0 16.5 17.0 etc.), and for the minute indications, 60 tongues 18m, which are tuned to the minute frequencies (that is, for example, 30.0 30.5 31.0 etc.). The oscillating tongues carry cores 19 which lie between slots of the permanent magnets 20 and in the field range of the windings 21, on which the time frequencies are given. The tongues 18h from the hour series and the tongues 18m from the minute series, whose natural frequencies correspond with the two time frequencies being transmitted, are put into oscillation by resonance. This is made visible, for example, by the fact that the bent ends of the tongues, painted with white and preferably self illuminating color, are normally hidden behind the front plate 22, and visible in the oscillation state of the tongues in a coordinated inspection hole 23, which then appears white or illuminated. An example of the form of the front plate 22 with the inspection holes 23 is given in Figure 5. According to that, the oscillating tongues for the hours are arranged in two rows of six each and below them the tongues for the minute indications in two rows of 30 each. The plate 22 can consist, for example, of glass, which is painted black outside the inspection holes and has figures like a radio scale. It can also form a part of some other radio scale, in case the radio clock is combined with a radio receiver, whose antenna connections are indicated by 24 in Figure 1b.

According to the present explanation of the principle, it is clear in the first example of construction that other frequency generators, for example, adjustable semi-incandescent lamp oscillating circuits can be provided on the transmitter and other resonators can be used on the receiver, for example, such as work according to the principle of the condenser loud speaker, or oscillating tongues which are excited mechanically by a coupling member which itself has no natural frequency and is excited electrically, for example, by a moving coil, or with the use of higher frequencies, permanently tuned electrical oscillation circuits are provided as resonators.

The devices according to the principle just described, with permanently tuned resonators, is in general provided a time indication only by jerks. Also mechanical resonators in vehicles running with vibrations are endangered by interference resonances. The preferred form of construction of a radio clock according to the invention is given in Figures 2a, 2b, 3a, and 3b.

The transmitting device according to Figure 2a contains a tube generator 25h, whose transmission frequency in the time of 12 hours is varied continuously in the range in such a way that the of a certain high frequency band, in such a way that the transmitted high frequencies are repeated cyclically every 12 hours. The control of the tube generator is symbolized in the diagram by an adjustable disc condenser 26h, which is coupled in the feedback circuit with the hour indicator shaft 27h of a chronometer or a synchronously running shaft. A second tube generator 25m works in another high frequency range in such a way that its transmission frequency is coupled through a shaft 27m rotating once per hour with the adjustable disc condenser 26m, continuously over the range, in the course of each hour, with cyclical repeat. The two high frequencies characterizing the time at each moment are radiated over the antenna 28.

With the antenna 29 of the receiver are coupled two adjustable oscillation circuits 30h and 30m, one of which, 30h, can be tuned to all the frequencies of the hour frequency band and the other, 30m, to the frequencies of the minute frequency band, for example, by the rotation of the adjustable disc condenser 31h or 31m. The adjustable disc condensers are in driving connection with a shaft 32, which is rotated by a small motor 33 at such a speed that the tuning range of the two circuits 30 is passed through about 16 times per second. Shaft 32 also carries an arm 34, to which are fastened two lamps 35h and 35m. The two lamps rotate behind two concentrical, transparent or translucent rings 36h and 36m of an otherwise opaque scale plate 37, which is provided with marks like a clock dial. The lamps are given a current impulse, if necessary through suitable amplification devices, whenever the receiver circuit 30h or 30m is tuned to the hour or minute frequency at the time. The hour frequency and the tuning position of the condenser 31h are so related that the hour circuit 30h has resonance when the lamp 35h coordinated with it can be considered as the point of an hour indicator which has a position corresponding to the chronometer time behind the ring 36h. Correspondingly, the minute circuit has resonance when the lamp 35m fed by it, considered as the point of a minute indicator, has the position indicating the current minute in the ring 36m and corresponding with the position of the chronometer minute indicator. By the indicated speed of rotation of shaft 32 it is brought about that the current impulses reaching the lamps 35h and 35m produce a continuous light impression on the eye. Consequently two points of light are visible behind the scale 37, of which the one behind the ring 36 moves continuously and synchronously with the hour indicator of the transmitting chronometer and the other, behind the ring 36m, continuously and synchronously with the minute indicator of the transmitting chronometer.

In the receiver connection shown, two high frequency amplifying tubes 38h and 39h and 38m and 39m are connected before each lamp and in addition to those already mentioned, there are two more adjustable disc condensers 40h and 40m, driven by shaft 32, which are in the coupling oscillation circuits 41h and 41m and thus, through retuned high frequency amplification, serve for a sharpened tuning to the time frequencies. The lamps 35h, 35m receive their voltage through separate slip rings 42h, 42m. At the same time, a radio receiver can be connected to the antenna 29 at 43, which can be combined in the same housing with the radio clock. It is evident that the points of light of the radio clock, if they are connected only temporarily, immediately indicate the correct time.

A similar example of construction is shown in Figures 3a and 3b. It differs from the previous one substantially only in the fact that natural high frequencies are not used as the time frequencies, but modulation frequencies are used preferably radiating from the transmitter of another program. The hour and minute frequencies, which belong to two bands separate from each other, should in this case lie above the program frequencies, that is, in the supersonic range. A tube generator 44h, with a condenser 46h, adjustable by the hour shaft 45h, in the circuit 47h, generates the hour frequencies, a tube generator 44m, with a condenser 46m adjustable by the minute shaft 45m, in the oscillation circuit 47m, delivers the minute frequencies, as described above. These frequencies are sent through a transformer 48 into the grid circuit of a modulation tube, which at the same time takes the program frequencies through transformer 50 and modulates the current of the transmitter tube 52 working, for example, in the short wave range, the current coming to the transmission antenna 51. With the tuning of the receiver to this transmitter through antenna 53 and tuning circuit 54 there come through the audion 55 and perhaps through a low pass filter 56, which keeps away the high modulation frequencies used as time frequencies, the program frequencies into the amplification part 57 provided for this.

The time frequencies, on the other hand, are again taken by two tunable circuit 58h and 58m, amplified by amplifiers 59h and 59m and supplied to rotating lamps 60h and 60m which, driven by a motor 61 through shaft 52, together with the condensers 63h, 63m effect the time indication in the same way as described above.

Clock hands can be provided for indicating the time according to the invention, as in the clocks which have been usual heretofore. An example of this is shown in Figure 4. The time frequencies transmitted, which may vary by jerks as in Figure 1 or continuously as in Figures 2 and 3, and can be fundamental frequencies or modulation frequencies, are here again effective on tunable circuits 64h and 64m. The adjustable disc condenser 65h of the circuit 64h is in driving connection with a shaft 66h which carries an hour hand 67h and a ratchet wheel 68h, for example, with 48 teeth. The adjustable disc condenser 65m of the circuit 64m is in driving connection with a sleeve 66m, rotatable around shaft 66h, which carries a minute hand 67m and a ratchet wheel 68m with 60 teeth. The wheels 68h and 68m can be driven through step-by-step motors, which consist of the switch magnets 69h and 69m, the connecting pawls 70h and 70m and the automatic breaker contacts 71h and 71m and are controlled by the contacts rh and rm of the two relays Rh and Rm. As long, for example, as the contact rh is closed, the step-by-step motor coordinated with wheel 68h drives this wheel and rotates shaft 66h with the hour hand 67h and the condenser 65h. But as soon as the circuit 64h is tuned to the hour frequency of the time, the relay Rh receives current through the amplifier 72h, opens its contact rh, the step-by-step motor is thus stopped. Correspondingly, through the step-by-step motor coordinated with the wheel 68m, the minute hand is adjusted with control through the minute frequency. When, after another minute, the circuit 64m is again de-tuned with respect to the minute frequency, varied in the meantime by jerks or continuously, the relay Rm is lowered and excites its step-by-step motor, which by shifting the wheel 68m by one tooth again produces resonance. Correspondingly, the step-by-step motor for the hour hand, for example, at intervals of 15 minutes, becomes effective to advance the hour hand. The step-by-step mechanisms are under control by the time frequencies and the relays Rh and Rm, that is, they act as automatic resetting devices, and can be replaced by other known automatic resetting devices. It is also obvious here that with a connection of the clock at any time desired, the two hands will be placed in the correct position. For the sake of this decided advantage, the possibility, which also is within the scope of the invention, of transmitting only one (minute) frequency and of driving the hour hand from the minute hand through a 1:12 reduction, generally will not be used.

As already noted, the devices described concern examples of construction, many variations being possible within the scope of the invention. Other means can be used for the production, the transmission and the reception of time frequencies. Likewise, there are also other possibilities for the transformation of the time frequency picture into a visible indication picture in the scope of the general idea of the invention. Thus, to indicate only a few, instead of rotating lamps, mirror-controlled light rays can be used, in connection with circular or linear time scales, or electron rays can produce the image in connection with a fluorescent screen. It is possible, by means of time frequencies controlled in the manner indicated, instead of acting on the eye, for example, on a running band of film or the like, to operate in such a way as to have a registration of the exact time, perhaps in combination with other measurements. For such scientific purposes, or in a given case, also navigating purposes, it would be advisable, in addition to the hour and minute frequencies transmitted in the examples described, to transmit also second frequencies, which control in the receiver a light mark, mechanical mark or the like, indicating the seconds, according to the principles indicated.

The drawings and the foregoing specification constitute a description of the improved process and apparatus for the transmission and indication of time, in such full, clear, concise and exact terms as to enable any person skilled in the art to practice the invention, the scope of which is indicated by the appended claims.

What I claim as my invention is:

1. In an indicating device for use with a generator of frequencies variable in accordance with a condition, the combination of an oscillation circuit adapted to be tuned for resonance with the range of frequencies thus generated, indicating means for registering the status of said condition movable through a range of indicating positions, mechanism for tuning said circuit through said range of frequencies and for driving said indicating means through said range of positions at the same rate, and control means operatively connected to said mechanism and operative to regulate the rate of tuning of said circuit to maintain the latter continuously in resonance with the frequencies generated, whereby said indicating means continuously registers the status of said condition.

2. The device as defined in claim 1, said mechanism comprising an electromagnet and a ratchet wheel, a second circuit for energizing said electromagnet, and a pivotally mounted rocker adapted to be actuated by said electromagnet, said rocker having a pawl thereon engageable with said ratchet wheel to advance the latter when said rocker is thus actuated, and normally closed contacts in said second circuit, said rocker having a portion adapted to engage one of said contacts and open said contacts when said rocker is thus actuated, thereby to afford a step by step advance of said ratchet wheel.

3. In an indicating device for use with a generator of frequencies variable in accordance with a condition, the combination of an oscillation circuit adapted to be tuned for resonance with the range of frequencies thus generated, mechanism for tuning said circuit through the said range of frequencies, said mechanism including an adjustable condenser and drive means for driving said condenser thus to tune said circuit, indicating means for registering the status of said condition movable through a range of indicating positions, said indicating means being coupled to said drive means and driven thereby through its range of indicating positions at the same rate as said circuit is tuned through the range of frequencies, and control means operatively connected to said drive means and operative to regulate the rate of tuning of said circuit to maintain the latter continuously in resonance with the frequencies generated, whereby said indicating means continuously registers the status of said condition.

4. The device as defined in claim 3, said drive means comprising a motor, and said control means being actuated in response to resonance of said circuit with the frequencies generated and operative, when thus actuated, to render said motor inoperative.

5. The device as defined in claim 3, said drive means comprising an electric motor and a second circuit for energizing said motor, and said control means comprising a relay having a normally closed contact in said second circuit, said relay being energized by said oscillation circuit when the latter is in resonance with the frequencies generated, and said contact being actuated by said relay, when the latter is thus energized, to open said second circuit and deenergize said motor.

6. In an indicating device for use with a generator of frequencies variable in accordance with a condition, the combination of an oscillation circuit adapted to be tuned for resonance with the range of frequencies thus generated, indicating means for registering the status of said condition movable through a range of indicating positions, mechanism for tuning said circuit through said range of frequencies and for driving said indicating means through said range of positions at the same rate, and control means operatively connected to said mechanism and operative to regulate the rate of tuning of said circuit to maintain the latter continuously in resonance with the frequencies generated, whereby said indicating means continuously registers the status of said condition, said mechanism comprising an electric motor and a second circuit for energizing said motor, and said control means comprising a relay having a normally closed contact in said second circuit, said relay being energized by said oscillation circuit when the latter is in resonance with the frequencies generated, and said contact being actuated by said relay, when the latter is thus energized, to open said second circuit and deenergize said motor.

7. In an indicating device for use with a generator of frequencies variable in accordance with a condition, the combination of an oscillation circuit adapted to be tuned for resonance with the range of frequencies thus generated, indicating means for registering the status of said condition movable through a range of indicating positions, mechanism for tuning said circuit through said range of frequencies and for driving said indicating means through said range of positions at the same rate, and control means operatively connected to said mechanism and operative to regulate the rate of tuning of said circuit to maintain the latter continuously in resonance with the frequencies generated, whereby said indicating means continuously registers the status of said condition, said mechanism comprising a motor, and said control means comprising a switch normally positioned to render said motor operative and shiftable to a position rendering said motor inoperative in response to a condition of resonance of said circuit with the frequencies generated.

8. In an indicating device for use with a generator of frequencies which vary in accordance with a condition, the combination of an oscillation circuit adapted to be tuned for resonance with the range of frequencies thus generated, indicating means for registering the status of the condition movable through a range of indicating positions, mechanism for tuning said circuit through said range of frequencies and for driving said indicating means through said range of indicating positions at the same rate, and control means operatively connected to said mechanism and operative to regulate the rate of tuning of said circuit to maintain the latter in continuous resonance with the frequencies generated, whereby said indicating means continuously registers the status of the condition, said mechanism comprising a step-by-step motor including an electro-magnet and a ratchet wheel, a second circuit for energizing said electro-magnet, a pivotally mounted rocker adapted to be actuated by said electro-magnet, said rocker having a pawl thereon engageable with said ratchet wheel to advance the latter when said rocker is thus actuated, normally closed contacts in said second circuit, said rocker having a portion adapted to engage one of said contacts to open said contacts when said rocker is thus actuated, thereby affording a step-by-step advance of said ratchet wheel, and said control means comprising a relay having a normally closed contact in said second circuit, said relay being energized by said oscillation circuit when the latter is in resonance with the frequencies generated, and said last-named contact being actuated by said relay when the latter is thus energized to open said last-named contact and deenergize said electro-magnet.

9. In an indicating device for use with a generator of frequencies variable in accordance with a condition, the combination of a frequency scanning receiver adapted to be tuned for resonance with the range of frequencies thus generated, indicating means for registering the status of said condition movable through a range of indicating positions, mechanism for tuning said receiver through said range of frequencies and for driving said indicating means through said range of positions at the same rate, and control means operatively connected to said mechanism and operative to regulate the rate of tuning of said receiver to maintain the latter continuously in resonance with the frequencies generated, whereby said indicating means continuously registers the status of said condition, said mechanism comprising a motor, and said control means comprising a control element for said motor normally positioned to render said motor operative, and means operated by said receiver when the latter is in resonance with the frequencies generated for shifting said control element to a position rendering said motor inoperative.

10. The device as defined in claim 9 in which said frequency scanning receiver comprises an oscillation circuit.

References Cited in the file of this patent

UNITED STATES PATENTS

| | | |
|---|---|---|
| 1,881,818 | McCann | Oct. 11, 1932 |
| 1,955,558 | Nelson et al. | Apr. 17, 1934 |
| 2,020,039 | Nicolson | Nov. 5, 1935 |
| 2,188,145 | Frantz | Jan. 23, 1940 |
| 2,428,389 | Singer | Oct. 7, 1947 |
| 2,469,744 | Razek | May 10, 1949 |
| 2,490,844 | Sorensen | Dec. 13, 1949 |
| 2,494,533 | Anthes | Jan. 17, 1950 |
| 2,498,933 | Wallace | Feb. 28, 1950 |
| 2,591,555 | Klopf | Apr. 1, 1952 |